(12) United States Patent
Holst et al.

(10) Patent No.: US 12,489,782 B2
(45) Date of Patent: Dec. 2, 2025

(54) METHOD FOR OPERATING A NETWORK

(71) Applicant: Siemens Aktiengesellschaft, Munich (DE)

(72) Inventors: Florian Holst, Munich (DE); Marcel Walter, Bamberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 328 days.

(21) Appl. No.: 18/247,195

(22) PCT Filed: Sep. 30, 2021

(86) PCT No.: PCT/EP2021/076985
§ 371 (c)(1),
(2) Date: Mar. 29, 2023

(87) PCT Pub. No.: WO2022/069657
PCT Pub. Date: Apr. 7, 2022

(65) Prior Publication Data
US 2025/0088528 A1 Mar. 13, 2025

(30) Foreign Application Priority Data
Sep. 30, 2020 (DE) .................... 10 2020 212 405.1

(51) Int. Cl.
*H04L 29/00* (2006.01)
*H04L 9/40* (2022.01)

(52) U.S. Cl.
CPC .......... *H04L 63/1441* (2013.01); *H04L 63/10* (2013.01); *H04L 63/1433* (2013.01); *H04L 63/20* (2013.01)

(58) Field of Classification Search
CPC . H04L 63/1441; H04L 63/10; H04L 63/1433; H04L 63/20; G06F 21/577
See application file for complete search history.

(56) References Cited

U.S. PATENT DOCUMENTS 7,647,634 B2 * 1/2010 Mayfield ............... H04L 69/324
726/22
7,809,667 B1 10/2010 Yehuda et al. .................. 706/47
(Continued)

FOREIGN PATENT DOCUMENTS

| CN | 110476167 A | 11/2019 | ............. G06F 21/55 |
| WO | 2007/075850 A2 | 7/2007 | ............... H04L 9/32 |

OTHER PUBLICATIONS

Yulin, Zou, "Security Configuration Verification System for Information/Security Classification Evaluation", Masters Dissertation, Ocean University of China, China Doctoral Dissertations Full-text Database (CDFD), 60 pages (Chinese w/ English abstract), May 23, 2013.

(Continued)

*Primary Examiner* — Don G Zhao
(74) *Attorney, Agent, or Firm* — Slayden Grubert Beard PLLC

(57) ABSTRACT

Various embodiments of the teachings herein include a method for operating a network having an endpoint administering a network resource. The method may include: defining a set of rules for the endpoint; monitoring compliance of the endpoint with the set of rules; allocating a score depending on the compliance; and implementing a measure based on the score.

10 Claims, 2 Drawing Sheets

(56) References Cited

U.S. PATENT DOCUMENTS

| | | | | |
|---|---|---|---|---|
| 7,917,481 B1* | 3/2011 | Kale | G06F 21/562 |
| | | | 707/693 |
| 8,566,932 B1* | 10/2013 | Hotta | G06F 21/567 |
| | | | 726/22 |
| 8,621,610 B2* | 12/2013 | Oberheide | H04L 63/145 |
| | | | 713/192 |
| 8,874,685 B1 | 10/2014 | Hollis | G06F 15/16 |
| 8,935,789 B2* | 1/2015 | Shukla | G06F 21/567 |
| | | | 713/164 |
| 9,137,096 B1 | 9/2015 | Yehuda | |
| 9,762,582 B1 | 9/2017 | Hockings | G06F 21/50 |
| 10,084,809 B1 | 9/2018 | Rambo | |
| 10,121,115 B2* | 11/2018 | Chrapko | G06N 20/00 |
| 10,187,410 B2* | 1/2019 | Greenberg | H04L 63/145 |
| 10,318,730 B2* | 6/2019 | Treadwell | G06F 21/52 |
| 11,044,273 B2* | 6/2021 | Dixit | H04L 63/20 |
| 2007/0030539 A1* | 2/2007 | Nath | H04W 12/08 |
| | | | 358/520 |
| 2007/0124803 A1 | 5/2007 | Taraz | 726/4 |
| 2007/0143827 A1* | 6/2007 | Nicodemus | H04L 63/102 |
| | | | 726/2 |
| 2007/0143851 A1* | 6/2007 | Nicodemus | G06F 11/3495 |
| | | | 726/4 |
| 2009/0165131 A1* | 6/2009 | Treadwell | G06F 21/52 |
| | | | 726/22 |
| 2009/0282476 A1* | 11/2009 | Nachenberg | G06F 21/577 |
| | | | 726/22 |
| 2009/0300720 A1* | 12/2009 | Guo | H04L 51/212 |
| | | | 726/3 |
| 2009/0328209 A1* | 12/2009 | Nachenberg | G06F 21/562 |
| | | | 726/22 |
| 2010/0192196 A1 | 7/2010 | Lee | 726/1 |
| 2013/0086690 A1* | 4/2013 | Nachenberg | G06F 21/577 |
| | | | 726/25 |
| 2014/0046645 A1 | 2/2014 | White | 703/13 |
| 2014/0331277 A1* | 11/2014 | Frascadore | G06F 9/45558 |
| | | | 726/1 |
| 2015/0281277 A1* | 10/2015 | May | H04L 63/10 |
| | | | 726/1 |
| 2016/0080399 A1* | 3/2016 | Harris | H04L 63/1433 |
| | | | 726/23 |
| 2016/0191465 A1* | 6/2016 | Thomas | H04L 63/20 |
| | | | 726/1 |
| 2016/0373478 A1 | 12/2016 | Doubleday | 726/25 |
| 2017/0201545 A1 | 7/2017 | Nicodemus | H04L 29/06 |
| 2018/0062941 A1 | 3/2018 | Brown et al. | |
| 2018/0322292 A1 | 11/2018 | Tedeschi | |
| 2018/0375891 A1 | 12/2018 | Juncker et al. | |
| 2019/0075081 A1* | 3/2019 | Adam | H04L 63/20 |
| 2019/0075082 A1* | 3/2019 | Adam | H04L 63/20 |
| 2019/0164082 A1* | 5/2019 | Wu | G06N 20/00 |
| 2019/0303583 A1 | 10/2019 | Hosking et al. | |
| 2019/0342286 A1 | 11/2019 | Cobb | H04L 29/06 |
| 2020/0007570 A1* | 1/2020 | Lam | H04L 63/1433 |
| 2020/0021620 A1 | 1/2020 | Purathepparambil | H04L 29/06 |
| 2020/0092374 A1* | 3/2020 | Mehta | H04L 67/125 |
| 2020/0099719 A1* | 3/2020 | Rahkonen | H04L 67/568 |
| 2020/0162944 A1* | 5/2020 | Barton | H04W 24/04 |
| 2020/0244698 A1* | 7/2020 | Pal | H04L 63/1466 |
| 2020/0322169 A1* | 10/2020 | Michaud | H04L 9/3247 |
| 2020/0322321 A1* | 10/2020 | Lynn | H04L 63/08 |
| 2020/0322330 A1* | 10/2020 | Lynn | H04L 63/20 |
| 2020/0387911 A1* | 12/2020 | Yoon | H04L 63/123 |
| 2020/0389496 A1* | 12/2020 | Xuan | H04L 63/10 |
| 2022/0051038 A1* | 2/2022 | Coimbra De Andrade | B60W 40/09 |
| 2022/0210163 A1* | 6/2022 | Norman | H04L 63/20 |
| 2023/0177169 A1* | 6/2023 | Bulut | G06N 5/04 |
| | | | 726/1 |
| 2024/0388901 A1* | 11/2024 | Gandhi | H04W 12/06 |
| 2025/0088528 A1* | 3/2025 | Holst | H04L 63/1433 |

OTHER PUBLICATIONS

Alsaleh, Mohammed Noraden et al., "ROI-Driven Cyber Risk Mitigation Using Host Compliance and Network Configuration," Journal of Network and Systems Management, vol. 25, No. 4, pp. 759-783, Nov. 19, 2017.

Chinese Office Action, Application No. 202180067222.3, 7 pages, Apr. 9, 2025.

Search Report for International Application No. PCT/EP2021/076985, 16 pages, Dec. 22, 2021.

Office Action for DE Application No. 10 2020 212 405.1, 8 pages, Apr. 22, 2021.

CN 110476167 A, US 2018/0375891 A1.

Chinese Decision to Grant, Application No. 202180067222.3, 4 pages.

* cited by examiner

METHOD FOR OPERATING A NETWORK

CROSS-REFERENCE TO RELATED APPLICATIONS

This application is a U.S. National Stage Application of International Application No. PCT/EP2021/076985 filed Sep. 30, 2021, which designates the United States of America, and claims priority to DE Application No. 10 2020 212 405.1 filed Sep. 30, 2020, the contents of which are hereby incorporated by reference in their entirety.

TECHNICAL FIELD

The present disclosure relates to networks. Various embodiments of the teachings herein include methods and/or systems for operating a network having at least one endpoint which administers at least one network resource.

BACKGROUND

Networks in companies and production facilities are regularly subjected to numerous attacks by third parties. Ensuring IT security is thus accorded high importance. IT security in the context of the present disclosure includes information security and/or functional security.

SUMMARY

The teachings of the present disclosure may provide methods and/or systems for operating a network which can be implemented securely and which has an option for automation. For example, some embodiments include a method for operating a network having at least one endpoint which administers at least one network resource, comprising: defining a rule set having at least one rule for the at least one endpoint, monitoring compliance of the at least one endpoint with the rule set, allocating a score depending on the compliance, and determining at least one measure depending on the score.

In some embodiments, the rule set having the at least one rule is a rule set for administration of the at least one network resource by the at least one endpoint.

In some embodiments, the at least one measure comprises limiting privileges of the endpoint in the network depending on the score.

In some embodiments, the at least one measure comprises a termination of the operation of the network.

In some embodiments, the at least one endpoint is formed with in each case at least one network resource and/or at least one item of administrator hardware, e.g. a client computer and/or authentication hardware, and/or at least one hardware interface, e.g. a user account.

In some embodiments, the at least one network resource is formed with hardware, in particular a server, and/or with software, in particular an operating system and/or an application program for application by means of the network.

In some embodiments, the rule set defines the regularity and/or timeliness of an update of the software and/or of software on the hardware.

In some embodiments, the score is dependent on a period of time over which at least one update is missed, and/or dependent on a number and/or a criticality regarding IT security of missed updates.

In some embodiments, the measure comprises a change or limitation of administrative privileges.

In some embodiments, the measure comprises a linking or change of the linking of the endpoint to the network. In some embodiments, the measure comprises training for an administrator connecting to the endpoint.

In some embodiments, the score is allocated in at least two categories and the training, e.g. by means of modules, is adapted depending on the score in the categories, e.g. on the occupancy of the categories and/or the absolute and/or relative weight of the categories, and/or wherein an administrator is authorized with respect to the network only after training.

In some embodiments, the score is assigned or maintained or changed depending on training, preferably repeated training, and/or checking, preferably repeated checking.

As another example, some embodiments of the teachings herein include a computer program product, in particular designed for application in one or more of the methods described herein, furthermore designed for storing a rule set having at least one rule for the at least one endpoint, for receiving monitoring data concerning the compliance of the at least one endpoint with the rule set, and for allocating a score depending on the compliance.

BRIEF DESCRIPTION OF THE DRAWING

The teachings of the present disclosure are explained in greater detail below on the basis of an exemplary embodiment illustrated in the drawing. The sole FIGURE schematically shows in cross-section a company network having network resources which are administered by means of the company network.

DETAILED DESCRIPTION

Figure 1:
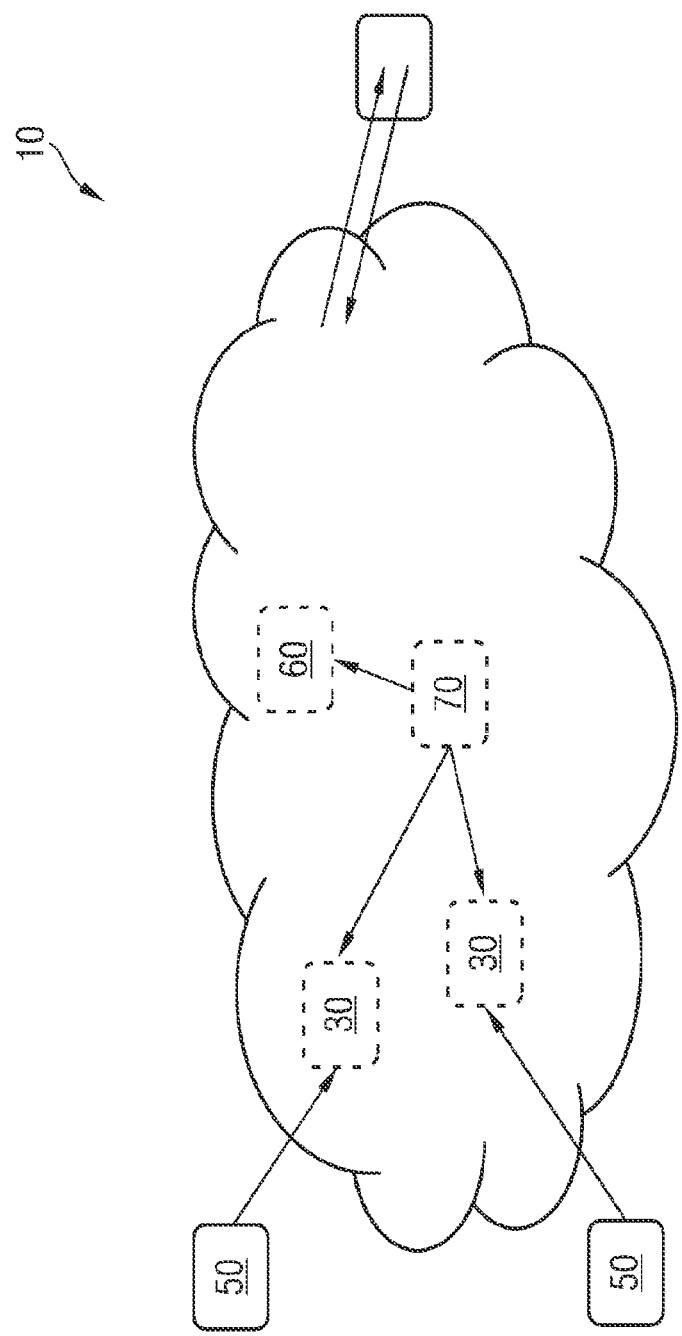
Figure 2:
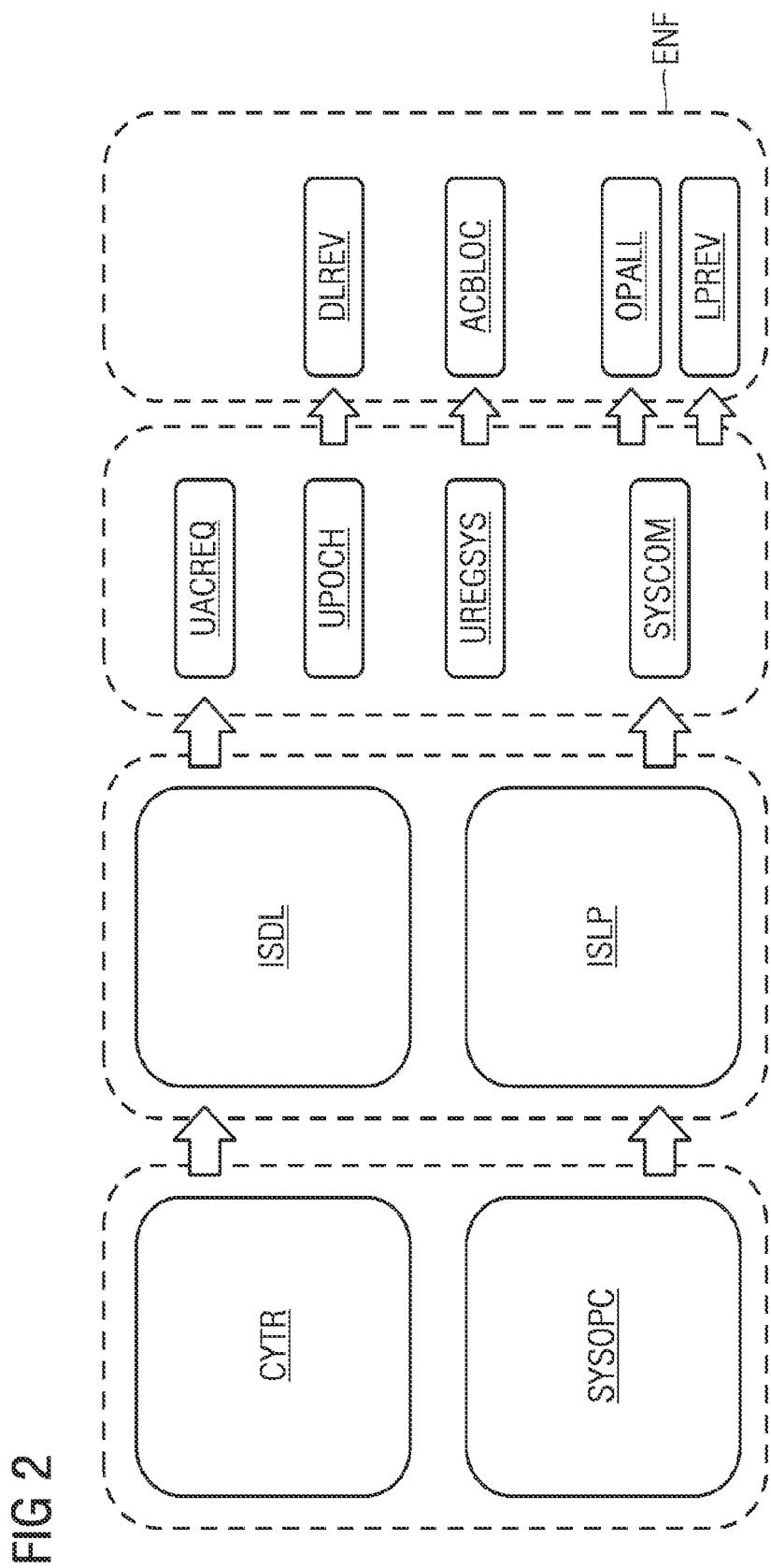

Teachings of the present disclosure include methods and/or systems for operating a network having at least one endpoint administering at least one network resource. In other words, for operating a network having at least one endpoint which administers at least one network resource. That is to say that the at least one endpoint administers the at least one network resource.

In some embodiments, the at least one endpoint administers the at least one network resource by virtue of the endpoint configuring at least one parameter of the at least one network resource that is relevant to IT security, e.g. software of the endpoint, in particular an operating system. The at least one network resource is such a network resource which not just the at least one endpoint which administers this network resource can access, but rather which one or more further endpoints of the network can access.

Some embodiments include:
defining a rule set having at least one rule for the at least one endpoint, e.g. for administration of the at least one network resource by the at least one endpoint,
monitoring compliance of the at least one endpoint with the rule set,
allocating a score depending on the compliance, and
determining at least one measure depending on the score.

In some embodiments, the method is a computer-implemented method.

The at least one network resource can be in each case part of the at least one endpoint which administers this network resource. In some embodiments, the at least one network resource is present in each case in a manner physically separated from the at least one endpoint which administers this network resource.

In some embodiments, the at least one measure is implemented after the at least one measure has been determined depending on the score. In some embodiments, the measure is a measure for increasing the compliance of the at least one endpoint with the rule set and/or a measure for increasing IT security when further endpoints of the network access the network resource.

The network can be operated in accordance with IT security requirements. Expediently, the rule set comprises rules concerning IT security, and so networks, for instance in companies or production facilities, can easily be safeguarded by means of the methods described herein.

In some embodiments, the rule set comprises at least one rule for administering the authorization in respect of access—which is secure regarding IT security—to the network resource on the part of further endpoints of the network, i.e. endpoints which do not administer the network resource.

In some embodiments, the at least one measure comprises limiting privileges of the endpoint in the network depending on the score. In particular, limiting the privileges is limiting the privileges for administering the network resource. In this regard, for instance, administering the network resource can be restricted to a less security-critical subset of privileges.

In some embodiments, the at least one measure comprises a termination of the operation of the network. In the extreme case where further operation of the network would not be responsible, a termination of the operation of the network can be taken into consideration. In some embodiments, in one development of the invention, the at least one measure comprises a termination of the operation of the network resource or a restriction of access to the network resource on the part of further endpoints of the network which do not administer the network resource.

In some embodiments, the at least one endpoint is formed with in each case at least one network resource and/or at least one item of administrator hardware, e.g. a client computer and/or authentication hardware, and/or at least one hardware interface, preferably a user account. The client computer or authentication hardware, for instance an electronically readable corporate identity card, can be coupled to an administrator account, such that only a single administrator can connect to the endpoint.

In some embodiments, the at least one network resource is formed with hardware, in particular a server, and/or with software, in particular an operating system and/or an application program for application by means of the network.

In some embodiments, the endpoint forms an administrator interface.

In some embodiments, the rule set defines the regularity of an update of the software and/or of software on the hardware.

In some embodiments, the score is dependent, or is formed dependently, on a period of time over which at least one update is missed, and/or is dependent, or is formed dependently, on a number and/or a security criticality of missed updates.

In some embodiments, the measure comprises a change or limitation of administrative privileges and/or a change of the linking of the endpoint to the network, for instance a separation of the endpoint from the network, or a change of authorizations in the linking to the network, and/or training for an administrator connecting to the endpoint. In some embodiments, the measure comprises a change or extension of administrative privileges.

Expediently, in the latter case of the aforementioned development, the score is allocated in at least two categories and the training, e.g. by means of modules, is adapted depending on the score in the categories, e.g. depending on the occupancy of the categories and/or the absolute and/or relative weight of the categories.

In some embodiments, an administrator is authorized with respect to the network only after training.

In some embodiments, the score is assigned or maintained depending on training, e.g. repeated training, and/or checking, e.g. repeated checking.

Some embodiments include a computer program product designed for application in one or more of the methods described herein. The computer program product stores a rule set having at least one rule for the at least one endpoint, for receiving monitoring data concerning the compliance of the at least one endpoint with the rule set, and for allocating a score depending on the compliance.

The network 10 shown in the FIGURE comprises a company network with interconnected computers. Some of the computers of the network 10 form distributed servers 30 for network resources. Further computers of the network 10 are realized as client computers 50 for administering the servers 30. Both the servers 30 and the client computers 50 form endpoints of the network 10, which either as servers 30 feed contents or services into the network 10 or as client computers 50 for administrative tasks provide an interface to an administrator. In the exemplary embodiment illustrated, the network 10 is designed as a cloud network. In this cloud network, the servers 30 are not present as separate computers isolated from one another with regard to their respective hardware, rather the servers 30 are each present as logical servers 30 in the sense of a distributed database stored on a multiplicity of computers of the network 10. In some embodiments, the network 10 can also be designed as some other, conventional, for instance hierarchical, network 10 containing the servers 30 as separate, physically separated hardware servers.

The servers 30 are configured to operate project coordination software by means of the network 10. By means of the project coordination software, users can feed project milestones into the system and coordinate them with one another with regard to their attainment, such that a user acquires a rapid overview of a project status and of the fulfilment of their obligations with regard to the project milestones.

The network additionally contains a central rights management server 60, which grants or denies access rights to the network resources.

The network 10 additionally comprises a monitoring unit 70, which monitors the security state of the network 10. The monitoring unit 70 checks an update state of the operating systems of the servers 30, for example the update state of Linux systems of the servers 30, at regular intervals or continuously. In this case, the monitoring unit 70 compares the up-to-date status of the respective operating system with a target up-to-date status of the operating system, corresponding for instance to a recommendation of a repository maintainer of a distribution of the Linux system. By way of example, if current patches of the Linux system have not been installed, then a score is calculated depending on the period of time over which, despite a possibility of updating, the Linux system was not updated, and depending on the number and the security criticality of the patches, which is derived for instance from a classification on the part of the developers or by repository maintainers, which score is assigned to the respective server 30. By way of example, the score contains a sum of a quantity proportional to the abovementioned period of time (for example an indication of the period of time in hours with a proportionality factor) and a quantity which cumulates a measure (e.g. a value number of "5" for "highly critical", a value number of "3" for "critical" and a value number of "1" for "recommended") for the security criticality of each patch missed despite availability. In this way, each server 30 is assigned a score for the security of the operating system, which score turns out to be all the higher, the greater the number or the greater the severity of the security gaps of the respective server 30.

A score of the same kind is also assigned to the project coordination software depending on patches or updates available for this software.

The sum of the score for the project coordination software and the score for the operating system forms a total score for the server 30, which is assigned to the server 30 as a certificate. If the total score exceeds a first critical threshold value, then this total score or information about this first threshold value being exceeded is communicated to the rights management server 60, which initiates a measure for increasing the security of the network 10 on account of the first threshold value being exceeded. The measure may mean, for instance, restricted operation of the server 30 in an emergency mode or—in the event of the threshold value being exceeded significantly, for instance by a factor of 50 percent—shutdown of the server 30 or of the network 10.

In addition, such a total score is not just assigned to the server 30. Rather, a total score is also assigned to the respective administrator (not explicitly illustrated in the drawing) responsible for the updating of the server 30 and of the project coordination software. This assignment here is effected either to a client computer 50 of the respective administrator or, in the case of a possible change of client computers 50 of the respective administrator, to an administrator account for privileged access to the network 10 for the administrator.

In the exemplary embodiment shown, the assignment of a total score to the server 30 and the ascribing of a score value to the administrator account are effected by means of a respective score account uniquely assigned to the server 30 and to the administrator account. The score accounts of the servers 30 and of the administrators are kept on the rights management server 60.

In the exemplary embodiment illustrated, the assignment is effected to an administrator account that is uniquely assigned to a concrete administrator in the exemplary embodiment shown. In this case, only those score values are ascribed to the administrator account which are allotted to software for which the administrator of the administrator account bears responsibility, i.e. with respect to which values the administrator of the administrator account actually undertakes updating tasks.

In order actually to be authorized for an administrator role for a server 30 of the network 10, an administrator must complete cyber security training CYTR, which provides information about an administrator rule set of security-relevant rules which is obligatory for the network 10. The security-relevant rules encompass, inter alia, the requirements for patches to be installed promptly and as completely as possible. Once the administrator completes the cyber security training CYTR, the administrator is awarded an administrator certificate ISDL. On the basis of the administrator certificate ISDL, a cryptographic signature as administrator signature is added to the administrator account and authorizes the latter as administrator of the server 30.

At the same time, the server 30 itself must also satisfy security requirements that are summarized in a system target configuration SYSOPC, which means an up-to-date status of all software installed on the server 30, here of the operating system and of the project coordination software. After a check in regard to a configuration of the server 30 that satisfies the system target configuration SYSOPC, a server authorization ISLP with respect to the network 10 is acknowledged for the server 30. On the basis of the server authorization ISLP with respect to the network 10, a further cryptographic signature in the form of a server signature is conferred on the server 30, which signature identifies the server 30 as at least initially satisfying the system target configuration SYSOPC. By means of the server signature, the server 30 is authorized for linking into the network 10.

In the exemplary embodiment illustrated, an administrator logs on to the network 10 for the purpose of administering a server 30 as follows:

Firstly, an administrator performs authentication UACREQ vis-à-vis the network 10 in a manner known per se. For this purpose, the administrator, by means of the latter's administrator account, communicates a unique identifier to the network 10. On the basis of the administrator signature assigned to the identifier, the rights management server 60 checks whether the administrator has an administrator certificate. If this is the case, then on the basis of the administrator signature an administrator account is ascertained and the score account assigned to this administrator account is identified. The score value held in the score account on an accounting basis is checked in regard to the first threshold value being exceeded. If the score value lies below the first threshold value, then the logging on to the network 10 by the administrator is continued. If the score value lies above the first threshold value, then the administrator is rejected by the network 10.

In the further course of the process, the administrator chooses a server 30 on which the project coordination software is running and which is administered by the administrator. The server 30 checks whether the administrator has previously been registered UREGSYS to administer the server 30. If this is not the case, the administrator is rejected by the server 30. If the administrator has been registered to administer the server 30, then the logging on by the administrator is continued.

Finally, the rights management server 60 uses the server signature of the server 30 as a basis for checking whether the latter currently satisfies the system target configuration SYSOPC. If that is the case, then the administrator obtains the permission OPALL to administer the server 30. By contrast, if the server 30 currently does not satisfy the system target configuration SYSOPC, then the server authorization ISLP is cancelled.

In the exemplary embodiment illustrated, the server authorization ISLP of the server 30 and the administrator certificate ISDL for administering the server 30 are not just validated for the first authorization of the administrators and servers 30 with respect to the network 10. Rather, the maintenance of the administrator certificate ISDL is made dependent on the score value of the score account of the administrator account associated with the administrator and the server authorization ISLP is made dependent on the score value of the score account of the server 30. In this regard, the monitoring unit 70 continues to check the update state of the operating systems of the servers 30 at regular intervals or continuously.

If the score value of the score account of the administrator account associated with the administrator exceeds the first threshold value, then the administrator is excluded from the further administration of the server 30 by the rights management server 60. Furthermore, the server 30 is also disconnected from the network 10. In some embodiments, the administrator is not excluded from the further administration of the server 30, rather a corresponding message indicating the corresponding exceedance of the first threshold value is sent to a security representative of the network 10. Furthermore, the server 30 is not disconnected from the network 10, rather a message is sent to the security representative of the network 10 so that said representative can scrutinize the circumstance more closely.

If an administrator of a server 30 of the network 10 transgresses the score account assigned thereto, then training can be imposed on the administrator by the rights management server 60, the administrator being awarded the administrator certificate ISDL again after carrying out said training. In particular, the score value can be determined in a plurality of dimensions, for instance each related to the software of the server 30 that is configured by it, here for instance firstly of the project coordination software and of an operating system of the server 30. If, in the event of the exceedance of the first threshold value of the score value of the score account assigned to the administrator by means of the administrator account, it is established that the exceedance is attributable for the most part to deficient updating of the operating system of the server 30, then the training can provide, in an automated manner, a higher weighting of contents related to the operating system of the server 30.

For this purpose, the score values are expediently acquired in those dimensions, i.e. categories, for which training contents are available in a modularized manner. In the exemplary embodiment illustrated, the training contents are present in a modularized manner in 5 to 10 categories, which are included in training for the administrators for instance if the categories are occupied by entries when the score value is exceeded. Those categories which are not assigned a score value different than zero either remain totally disregarded during a weighting of the training or are taken into consideration with a standard content which differs from a refresher training content which is included in the training for the administrator if the category is occupied by a score value different than zero. In the exemplary embodiment illustrated, the training modules are compiled in an automated manner by means of software of the rights management server 60.

What is claimed is:

1. A method for operating a network having an endpoint administering a network resource, the method comprising:
    defining a set of rules for the endpoint;
    monitoring compliance of the endpoint with the set of rules;
    allocating a score depending on the compliance; and
    automatically implementing a measure based on the score;
    wherein the measure includes at least one option selected from the group consisting of: training for an administrator connecting to the endpoint, a change or limitation of administrative privileges, limiting privileges of the endpoint in the network, termination of operation of the network, termination of operation of the network resource, and restricting access to the network resource.

2. The method as claimed in claim 1, wherein the set of rules is for administration of the network resource by the endpoint.

3. The method as claimed in claim 1, wherein the endpoint includes an item of administrator hardware, authentication hardware, and/or a hardware interface.

4. The method as claimed in claim 1, wherein the network resource comprises hardware and/or software for application by the network.

5. The method as claimed in claim 1, wherein the set of rules defines the regularity and/or timeliness of an update of the software and/or of software on the hardware.

6. The method as claimed in claim 5, wherein the score depends on a period of time over which an update is missed, a number of missed updates, and/or a criticality level regarding IT security of missed updates.

7. The method as claimed in claim 1, wherein the measure comprises linking or changing a linking of the endpoint to the network.

8. The method as claimed in claim 1, further comprising:
    allocating the score in at least two categories; and
    adapting the training based on the score in the categories and/or authorizing an administrator with respect to the network only after training.

9. The method as claimed in claim 1, wherein the score is assigned or maintained or changed depending on training and/or checking.

10. A non-transitory computer program product storing a rule set for an endpoint, and a set of instructions for a processor, the set of instructions causing the processor to operate a network having an endpoint administering a network resource by:
    defining a set of rules for the endpoint;
    monitoring compliance of the endpoint with the set of rules;
    allocating a score depending on the compliance; and
    automatically implementing a measure based on the score;
    wherein the measure includes at least one option selected from the group consisting of: training for an administrator connecting to the endpoint, a change or limitation of administrative privileges, limiting privileges of the endpoint in the network, termination of operation of the network, termination of operation of the network resource, and restricting access to the network resource.

* * * * *